(12) United States Patent
Zhao et al.

(10) Patent No.: US 12,395,966 B2
(45) Date of Patent: *Aug. 19, 2025

(54) USER EQUIPMENT AND METHOD OF RESOURCE TRANSMISSION

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/762,580

(22) Filed: Jul. 2, 2024

(65) Prior Publication Data

US 2024/0357555 A1 Oct. 24, 2024

Related U.S. Application Data

(63) Continuation of application No. 17/554,165, filed on Dec. 17, 2021, now Pat. No. 12,069,616, which is a
(Continued)

(51) Int. Cl.
*H04W 72/02* (2009.01)
*H04L 1/1812* (2023.01)
(Continued)

(52) U.S. Cl.
CPC ............ *H04W 72/02* (2013.01); *H04L 1/1812* (2013.01); *H04L 5/0053* (2013.01); *H04W 72/0446* (2013.01); *H04W 72/0453* (2013.01)

(58) Field of Classification Search
CPC ............ H04W 72/02; H04W 72/0446; H04W 72/0453; H04L 1/1812; H04L 5/0053
See application file for complete search history.

(56) References Cited

U.S. PATENT DOCUMENTS 12,069,616 B2 * 8/2024 Zhao ..................... H04L 1/1812
2017/0215183 A1 7/2017 Gulati
(Continued)

FOREIGN PATENT DOCUMENTS

CN 109560842 A 4/2019
CN 109792594 A 5/2019
(Continued)

OTHER PUBLICATIONS

International Search Report issued in corresponding International Application No. PCT/CN2020/112229, mailed Nov. 30, 2020, 25 pages.
(Continued)

*Primary Examiner* — Brenda H Pham
(74) *Attorney, Agent, or Firm* — BAYES PLLC

(57) ABSTRACT

A user equipment and a method of resource transmission are provided. The method includes determining that physical sidelink feedback channel (PSFCH) resources for a resource pool are divided into M times N PSFCH resource sets in a frequency domain, each PSFCH resource set corresponds to a subchannel in a slot for the resource pool, and N is a number of physical sidelink shared channel (PSSCH) slots associated with a PSFCH slot, M is a number of subchannels for the resource pool, M and N are integers equal to or larger than 1. This can have enough resource for PSFCH transmission between multiple RX UEs, select resource of PSFCH per RX UE within an available transmission resource set, provide a good communication performance, and/or provide high reliability.

16 Claims, 10 Drawing Sheets

Determining that physical sidelink feedback channel (PSFCH) resources for a resource pool are divided into M times N PSFCH resource sets in a frequency domain, each PSFCH resource set corresponds to a subchannel in a slot for the resource pool, and N is a number of physical sidelink shared channel (PSSCH) slots associated with a PSFCH slot, M is a number of subchannels for the resource pool, M and N are integers equal to or larger than 1

Related U.S. Application Data continuation of application No. PCT/CN2020/112229, filed on Aug. 28, 2020.

(60) Provisional application No. 62/892,677, filed on Aug. 28, 2019.

(51) Int. Cl.
  H04L 5/00 (2006.01)
  H04W 72/0446 (2023.01)
  H04W 72/0453 (2023.01)

(56) References Cited

U.S. PATENT DOCUMENTS

| | | | |
|---|---|---|---|
| 2019/0044667 A1 | 2/2019 | Guo | |
| 2020/0037343 A1* | 1/2020 | He | H04W 72/20 |
| 2020/0112400 A1 | 4/2020 | Lee | |
| 2020/0221325 A1 | 7/2020 | Zheng | |
| 2020/0274649 A1* | 8/2020 | Lee | H04W 72/20 |
| 2021/0099901 A1* | 4/2021 | Huang | H04W 72/12 |
| 2021/0345360 A1* | 11/2021 | Yeo | H04W 72/20 |
| 2021/0400681 A1* | 12/2021 | Wang | H04L 5/0053 |
| 2022/0038217 A1* | 2/2022 | Yoshioka | H04L 1/1819 |
| 2022/0078757 A1 | 3/2022 | Wang | |
| 2022/0321278 A1* | 10/2022 | Yoshioka | H04L 1/1854 |

FOREIGN PATENT DOCUMENTS

| | | |
|---|---|---|
| CN | 109891981 A | 6/2019 |
| WO | 2019027304 A1 | 2/2019 |
| WO | 2019151915 A1 | 8/2019 |
| WO | 2020180032 A1 | 9/2020 |
| WO | 2020209594 A1 | 10/2020 |
| WO | 2020222568 A1 | 11/2020 |
| WO | 2020259580 A1 | 12/2020 |
| WO | 2021006499 A1 | 1/2021 |
| WO | 2021006500 A1 | 1/2021 |
| WO | 2021016748 A1 | 2/2021 |
| WO | 2021032509 A1 | 2/2021 |

OTHER PUBLICATIONS

Written Opinion of the International Searching Authority issued in corresponding International Application No. PCT/CN2020/112229, mailed Nov. 30, 2020, 4 pages.
"Discussion on physical layer procedures for NR sidelink", Agenda Item: 7.2.4.5, Source: LG Electronics, 3GPP TSG RAN WG1 Meeting #97, R1-1907018, Reno, USA, May 13-17, 2019, the whole document. 11 pages.
"Sidelink physical layer procedures for NR V2X", Agenda Item: 7.2.4.5, Source: Huawei, HiSilicon, 3GPP TSG RAN WG1 Meeting #97, R1-1906008, Reno, USA, May 13 17, 2019, the whole document. 24 pages.
"Discussion on PHY procedures for sidelink", Agenda item: 7.2.4.5, Source: ZTE , Sanechips, 3GPP TSG RAN WG1 #97, R1-1906469, Reno, USA, May 13-17, 2019, the whole document. 6 pages.
"Physical layer procedures for NR V2X sidelink communication", Agenda item: 7.2.4.5, Source: Intel Corporation, 3GPP TSG RAN WG1 Meeting #97, R1-1906799, Reno, USA, May 13-17, 2019, the whole document. 15 pages.
"On Physical Layer Procedures for NR V2X Sidelink", Agenda Item: 7.2.4.5, Source: InterDigital Inc., 3GPP TSG RAN WG1 #97, R1-1907096, Reno, USA, May 13-17, 2019, the whole document. 8 pages.
MediaTek Inc. "Physical layer procedures for sidelink", 3GPP TSG RAN WG1 #98, R1-1908401, Prague, CZ, Aug. 26-30, 2019, pp. 1-16.
First Office Action of the Japanese application No. 2021-577829, issued on Aug. 16, 2024. 8 pages with English translation.
Non Final Office Action of the U.S. Appl. No. 17/554,165, issued on Dec. 20, 2023. 37 pages.
Notice of Allowance of the U.S. Appl. No. 17/554,165, issued on Apr. 10, 2024. 12 pages.
European Search Report in the European application No. 23187923.0, mailed on Nov. 3, 2023. 5 pages.
First Office Action issued in corresponding Indian application No. 202117059888, mailed Sep. 13, 2022. 6 pages with English translation.
Second Office Action issued in corresponding Chinese application No. 202110573601.1, mailed Oct. 21, 2022. 13 pages with English translation.
ZTE et al., "Discussion on PHY procedures for sidelink", R1-1908896, 3GPP TSG RAN WG1 #98 Prague, CZ, Aug. 26-30, 2019, the whole document. 9 pages.
Huawei et al., "Sidelink physical layer procedures for NR V2X", R1-1908040, 3GPP TSG RAN WG1 Meeting #98 Prague, Czech Republic, Aug. 26-30, 2019, the whole document. 25 pages.
LG Electronics, "Discussion on physical layer procedures for NR sidelink", R1-1905443, 3GPP TSG RAN WG1 Meeting #96bis Xi'an, China , Apr. 8-12, 2019, the whole document. 12 pages.
Sony, "Discussion on physical layer procedures for NR sidelink", R1-1908772, 3GPP TSG RAN WG1 #98 Prague, Czech Republic, Aug. 26-30, 2019, the whole document. 5 pages.
NTT Docomo, Inc., "NR Sidelink Physical Layer Procedure", R1-1906209, 3GPP TSG RAN WG1 #97 Reno, USA, May 13-17, 2019, the whole document. 12 pages.
Intel Corporation, "Design of physical layer procedures for NR V2X sidelink communication", R1-1904299, 3GPP TSG RAN WG1 RAN1#96bis Xi'an, China, Apr. 8-12, 2019, the whole document. 11 pages.
Samsung, "On Physical Layer Procedures for NR V2X", R1-1908481, 3GPP TSG RAN WG1 #98 Prague, CZ, Aug. 26-30, 2019, the whole document. 20 pages.
LG Electronics, "Discussion on physical layer procedures for NR sidelink", R1-1908906, 3GPP TSG RAN WG1 Meeting #98 Prague, CZ, Aug. 26-30, 2019, the whole document. 19 pages.
OPPO, "Physical layer procedure for NR-V2X sidelink", R1-1908364, 3GPP TSG RAN WG1 #98 Prague, CZ, Aug. 26-30, 2019, the whole document. 13 pages.
ASUSTeK, "Discussion on sidelink physical layer procedure on NR V2X", R1-1909212, 3GPP TSG RAN WG1 #98 Prague, CZ, Aug. 26-30, 2019, the whole document. 9 pages.
Vivo, "Physical layer procedure for NR sidelink", R1-1908154, 3GPP TSG RAN WG1 Meeting #98 Prague, CZ, Aug. 26-30, 2019, the whole document. 19 pages.
Extended European Search Report issued in corresponding European application No. 20858036.5, mailed Jun. 14, 2022. 9 pages.
First Office Action issued in corresponding Chinese application No. 202110573601.1, mailed Aug. 8, 2022. 13 pages with English translation.
Intel Corporation, "NR V2X Sidelink Physical Layer Procedures", 3GPP TSG RAN WG1 Meeting #98, R1-1908638, Prague, Czech Republic, Aug. 26-30, 2019, the whole document. 16 pages.
CATT, "Sidelink physical layer procedures in NR V2X", 3GPP TSG RAN WG1 Meeting #98, R1-1908584, Prague, CZ, Aug. 26-30, 2019, the whole document. 9 pages.
First Office Action of the Australian application No. 2020335057, issued on Jan. 7, 2025. 3 pages.
Second Office Action of the Japanese application No. 2021-577829, issued on Jan. 10, 2025. 9 pages with English translation.

* cited by examiner

USER EQUIPMENT AND METHOD OF RESOURCE TRANSMISSION

CROSS-REFERENCE TO RELATED APPLICATIONS

This application is a continuation application of U.S. application Ser. No. 17/554,165, titled "USER EQUIPMENT AND METHOD OF RESOURCE TRANSMISSION" and filed on Dec. 17, 2021, which is a continuation application of International Application No. PCT/CN2020/112229, entitled "USER EQUIPMENT AND METHOD OF RESOURCE TRANSMISSION" filed on Aug. 28, 2020, which claims the benefit of priority to U.S. Application No. 62/892,677, filed on Aug. 28, 2019, all of which are incorporated herein by reference in their entireties.

TECHNICAL FIELD

The present disclosure relates to the field of communication systems, and more particularly, to a user equipment and a method of resource transmission in new radio vehicle-to-everything (NR-V2X), which can provide a good communication performance and/or provide high reliability.

BACKGROUND

In new radio vehicle-to-everything (NR-V2X), unicast, groupcast, and broadcast are all supported and discussed. For unicast and groupcast, to improve reliability and resource efficiency, feedback channel on sidelink (SL) is introduced. A receiver (RX) UE can feedback hybrid automatic repeat request (HARQ) acknowledgement (ACK) or negative acknowledgement (NACK) to a transmitter (TX) UE to assist TX UE's re-transmission. Based on the feedback from the RX UE, the TX UE can determine whether to do re-transmission or a new transmission.

For NR-V2X groupcast communication, if sidelink (SL) feedback is enabled, when a TX UE transmits data, each RX UE needs to do SL feedback to the TX UE. All the RX UEs should use the same feedback slot for physical sidelink feedback channel (PSFCH) transmission. Then there are two issues as the followings for resource selection.

1. How to select a resource of a physical sidelink shared channel (PSSCH) so that there is enough resource for PSFCH transmission between multiple RX UEs.

2. How to select transmission resource of PSFCH per RX UE within the available transmission resource set.

Therefore, there is a need for a user equipment and a method of resource transmission, which can provide a good communication performance and/or provide high reliability.

SUMMARY

An object of the present disclosure is to propose a user equipment and a method of transmission resource selection of the same, which can solve issues in the prior art, have enough resource for PSFCH transmission between multiple RX UEs, select resource of PSFCH per RX UE within an available transmission resource set, provide a good communication performance, and/or provide high reliability.

In a first aspect of the present disclosure, a user equipment includes a memory, a transceiver, and a processor coupled to the memory and the transceiver.

The processor is configured to determine that physical sidelink feedback channel (PSFCH) resources for a resource pool are divided into M times N PSFCH resource sets in a frequency domain, each PSFCH resource set corresponds to a subchannel in a slot for the resource pool, and N is a number of physical sidelink shared channel (PSSCH) slots associated with a PSFCH slot, M is a number of subchannels for the resource pool, M and N are integers equal to or larger than 1.

In a second aspect of the present disclosure, a method of resource transmission of a user equipment includes determining that that physical sidelink feedback channel (PSFCH) resources for a resource pool are divided into M times N PSFCH resource sets in a frequency domain, each PSFCH resource set corresponds to a subchannel in a slot for the resource pool, and N is a number of physical sidelink shared channel (PSSCH) slots associated with a PSFCH slot, M is a number of subchannels for the resource pool, M and N are integers equal to or larger than 1.

In a third aspect of the present disclosure, a non-transitory machine-readable storage medium has stored thereon instructions that, when executed by a computer, cause the computer to perform the above method.

In a fourth aspect of the present disclosure, a terminal device includes a processor and a memory configured to store a computer program. The processor is configured to execute the computer program stored in the memory to perform the above method.

In a fifth aspect of the present disclosure, a base station includes a processor and a memory configured to store a computer program. The processor is configured to execute the computer program stored in the memory to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
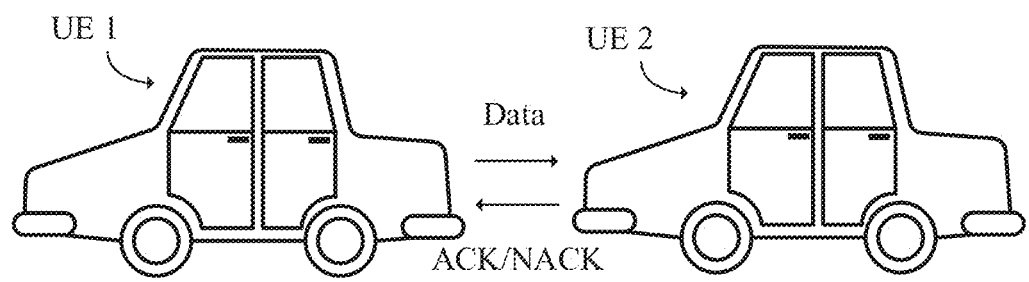
FIG. 1 is a schematic diagram of an exemplary illustration of a transmission and a feedback of user equipments (UEs).

FIG. 1 illustrates that, in some embodiments, in new radio V2X (NR-V2X), unicast, groupcast, and broadcast are all supported and discussed. For unicast, to improve reliability and resource efficiency, feedback channel on sidelink (SL) is introduced. A receiver UE (RX UE), such as a UE 2 can feedback a hybrid automatic repeat request (HARQ) acknowledgement (ACK) or a HARQ negative acknowledgement (NACK) to a transmitter UE (TX UE), such as UE 1 to assist TX UE's re-transmission.

Based on the feedback from the RX UE, the TX UE can determine whether to do re-transmission or a new transmission. In NR-V2X sidelink, a physical layer channel which is used to carry HARQ ACK/NACK is introduced, physical sidelink feedback channel (PSFCH).

For PSFCH carrying HARQ ACK/NACK, it can only occupy the last several OFDM symbols (OS) within a slot/subframe. For example, there are 14 OFDM symbols per slot, the PSFCH can only be transmitted at the last second and third OS, considering that the last OS is used for a guard period (GP).

Figure 2:
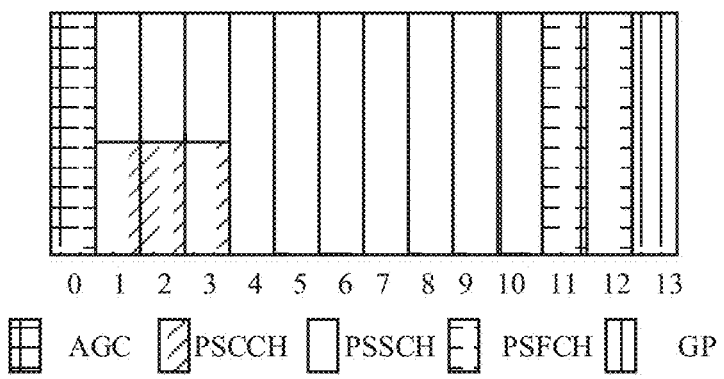
FIG. 2 is a schematic diagram of an exemplary illustration of a physical channel.

FIG. 2 illustrates that, in some embodiments, one example of the PSFCH is illustrated below. The transmission resource of PSFCH can be determined by transmission resource of physical sidelink shared channel (PSSCH). The PSFCH carries HARQ ACK/NACK corresponding to the PSSCH which is used to carry sidelink data packet of TX UE.

If there is a pre-configured mapping between transmission resource of PSSCH and PSFCH, then the transmission resource of PSFCH can be implicitly determined by the corresponding PSSCH.

For example, the timing gap between PSFCH and corresponding PSSCH is 2 slots. Then if PSSCH transmitted in slot n, the corresponding PSFCH will be transmitted in slot n+2. The frequency starting position of PSFCH can be aligned to the corresponding PSSCH, and the frequency length of PSFCH can be fixed to 1 PRB. Then based on the transmission of PSSCH, the transmission resource of PSFCH in a time domain corresponding to the PSSCH can be determined by (pre-) configured timing gap between the PSSCH and the PSFCH, a starting position of PSFCH resource in a frequency domain can be aligned with the PSSCH, and a frequency length of the PSFCH is 1 RB.

Figure 3:
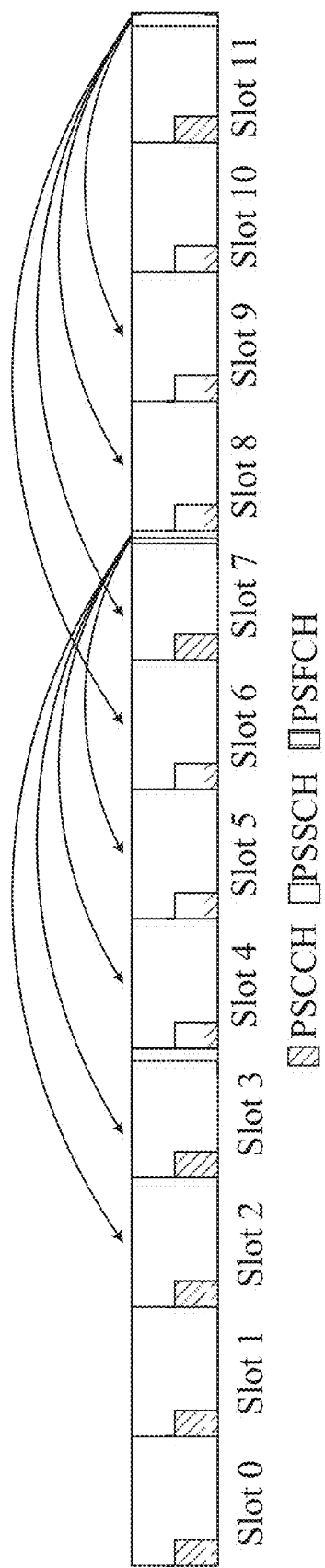
FIG. 3 is a schematic diagram of an exemplary illustration of a physical channel.

FIG. 3 illustrates that, in some embodiments, in NR-V2X, it is supported that the PSFCH can exist in every N slots, where N is an integer and N>=1. For N=1, that means PSFCH can exist in each slot. For N>1, there can be one slot per N slots within which PSFCH can be transmitted.

One example of N>1 is illustrated below. In FIG. 3, N=4, which means there is only one slot used for PSFCH transmission per every 4 slots. For simplicity, some embodiments do not show the AGC and GP symbols of each slot. In FIG. 3, the slots used for PSFCH transmission are slots 3, 7, and 11.

For each PSFCH slot, it corresponds to 4 slots used for PSSCH transmission which can be seen as a slot set. For example, the slot 7, which is used for PSFCH transmission, corresponds to the slot set which includes slots {2, 3, 4, 5}, which means the HARQ ACK/NACK corresponds to the PSSCH transmission within slot set of slots {2, 3, 4, 5} will be fed back by PSFCH in slot 7.

The slot 11, which is used for PSFCH transmission, corresponds to the PSSCH transmission within slot set which includes slots {6, 7, 8, 9}. The timing gap between the slot used for PSFCH and the first or last slot of the slot set that it corresponds to can be (pre-) configured or determined by the minimal processing capability of a UE.

Figure 4:
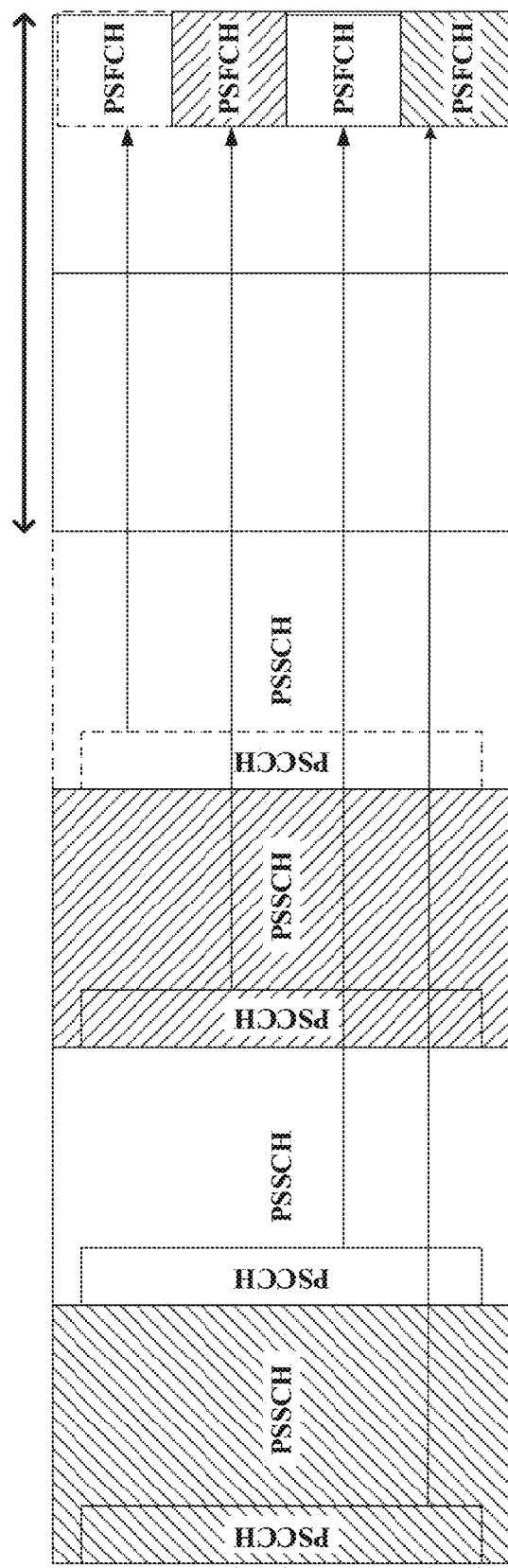
FIG. 4 is a schematic diagram of an exemplary illustration of multiple frequency division multiplexed (FDMed) physical sidelink feedback channels (PSFCHs).

FIG. 4 illustrates that, in some embodiments, an exemplary illustration of multiple frequency division multiplexed (FDMed) physical sidelink feedback channels (PSFCHs) is provided. In case of N>1, all the HARQ feedback corresponding to PSSCH of the same slot set will be transmitted in the same slot.

The resource for PSFCH transmission corresponding to the PSSCH transmitted within the slot set can be frequency multiplexed. In FIG. 4, N=4, then the slot set includes 4 slots, which corresponds to the PSFCH transmission in the same slot. For PSSCH transmission, the granularity in a frequency domain is sub-channel, which includes a set of continuous RBs in the frequency domain. The PSFCH transmissions in the feedback slot corresponds to PSSCH transmission in the slot set can be frequency multiplexed, i.e., the PSFCH transmission corresponding to the PSSCH in different slot uses different frequency resources.

For NR-V2X groupcast communication, if sidelink (SL) feedback is enabled, when a TX UE transmits data, each RX UE needs to do SL feedback to the TX UE. All the RX UEs should use the same feedback slot for physical sidelink feedback channel (PSFCH) transmission. Then there are two issues as the followings for resource selection. 1. How to select a resource of a physical sidelink shared channel (PSSCH) so that there is enough resource for PSFCH transmission between multiple RX UEs. 2. How to select transmission resource of PSFCH per RX UE within the available transmission resource set.

Some embodiments of the present disclosure provide a user equipment and a method of transmission resource selection of the same, which can solve issues in the prior art, select a resource of at least one of PSSCH or PSFCH, have enough resource for PSFCH transmission between multiple RX UEs, and/or select resource of PSFCH per RX UE within an available transmission resource set.

Figure 5:
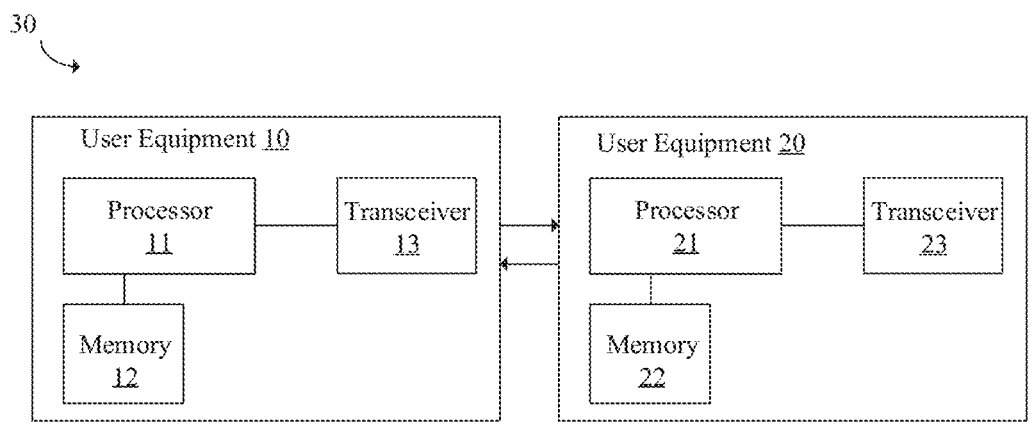
FIG. 5 is a block diagram of user equipments (UEs) in a communication network system according to an embodiment of the present disclosure.

FIG. 5 illustrates that, in some embodiments, user equipments (UE) 10 and 20 in a communication network system 30 according to an embodiment of the present disclosure are provided. The communication network system 30 includes the UE 10 and the UE 20. The UE 10 may include a memory 12, a transceiver 13, and a processor 11 coupled to the memory 12, the transceiver 13. The UE 20 may include a memory 22, a transceiver 23, and a processor 21 coupled to the memory 22, the transceiver 23.

The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device.

The transceiver 13 or 23 may include baseband circuitry to process radio frequency signals. When the embodiments are implemented in software, the techniques described herein can be implemented with modules (e.g., procedures, functions, and so on) that perform the functions described herein.

The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

In some embodiments, the processor 11 or 21 is configured to determine that that physical sidelink feedback channel (PSFCH) resources for a resource pool are divided into M times N PSFCH resource sets in a frequency domain, each PSFCH resource set corresponds to a subchannel in a slot for the resource pool, and N is a number of physical sidelink shared channel (PSSCH) slots associated with a PSFCH slot, M is a number of subchannels for the resource pool, M and N are integers equal to or larger than 1. This can solve issues in the prior art, have enough resource for PSFCH transmission between multiple RX UEs, select resource of PSFCH per RX UE within an available transmission resource set, provide a good communication performance, and/or provide high reliability.

In details, the above technical solution can be adopted in 3GPP specification. The above technical solution can correspond to the following: A UE is provided by rbSetPSFCH a set of $M_{PRB,set}^{PSFCH}$ PRBs in a resource pool for PSFCH transmission in a PRB of the resource pool. For a number of $N_{subch}$ sub-channels for the resource pool, provided by numSubchannel, and a number of $N_{PSSCH}^{PSFCH}$ slots associated with a PSFCH slot, provided by period-PSFCHresource, the UE allocates the $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH} - 1]$ PRBs from the $M_{PRB,set}^{PSFCH}$ PRBs to slot i and subchannel j, where $M_{subch,slot}^{PSFCH} = M_{PRB,set}^{PSFCH} / (N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB,set}^{PSFCH}$ is a multiple of $N_{subch} \cdot N_{PSSCH}^{PSFCH}$.

In some embodiments, the processor 11 or 21 is configured to perform a selection of a resource of at least one of a physical sidelink shared channel (PSSCH) or a physical sidelink feedback channel (PSFCH), and the selection of the resource of the at least one of the PSSCH or the PSFCH is associated with one or more receiver (RX) UEs.

The transceiver 13 or 23 is configured to perform a transmission of the resource of the at least one of the PSSCH or the PSFCH. This can solve issues in the prior art, select a resource of at least one of PSSCH or PSFCH, have enough resource for PSFCH transmission between multiple RX UEs, and/or select resource of PSFCH per RX UE within an available transmission resource set.

In some embodiments, a period of PSFCH resources is N slots.

In some embodiments, a correspondence between the PSFCH resource sets and PSSCH transmission resources comprises that the PSFCH resource sets are allocated to the PSSCH transmission resources according to the PSSCH transmission resources first in a time domain and then in the frequency domain. In details, PSSCH transmission resources are resources that may be used for PSSCH transmission, and each subchannel in each slot may be used to transmit a PSSCH.

In some embodiments, the PSFCH resource sets are allocated to the PSSCH transmission resources comprises that: a PSFCH resource set is allocated to slot i and subchannel j, in an ascending order of i and then in an ascending order of j; wherein i=1, 2, ... N, j=1, 2, ... M, and the PSFCH resource sets are allocated from lower frequency to higher frequency.

In some embodiments, the processor 11 or 21 is configured to determine a number of PSFCH resources available for multiplexing hybrid automatic repeat request-acknowledgement (HARQ-ACK) information in the PSFCH transmission.

In some embodiments, PSFCH transmissions from one or more receiver (RX) UEs within the same group can be frequency division multiplexed (FDMed) or code-division multiplexed (CDMed).

In details, the above technical solution, PSFCH transmissions from one or more receiver (RX) UEs within the same group can be frequency division multiplexed (FDMed) or code-division multiplexed (CDMed), can be adopted in 3GPP specification. The above technical solution can correspond to the following: A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSECH}$ is a number of cyclic shift pairs for the resource pool and, based on an indication by higher layers.

In some embodiments, each PSFCH resource set comprises X resources in the frequency domain, and Y resources in a code domain, X and Y are integers equal to or larger than 1.

In some embodiments, PSFCH transmission resources in a PSFCH resource set are indexed with numbers in an ascending order firstly in the frequency domain, and then in the code domain.

In some embodiments, the RX UEs select different resources firstly in the frequency domain for PSFCH transmission and then in a code domain.

In some embodiments, a PSFCH transmission resource is determined by a PSSCH transmission resource.

In details, X refers, corresponds, or is equivalent to $N_{subch}^{PSSCH} \cdot M_{subch,slot}^{PSSCH}$ PRBs. Y refers, corresponds, or is equivalent to $N_{CS}^{PSFCH}$. The above technical solution can be adopted in 3GPP specification. The above technical solution can correspond to the following: A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSFCH}$ is a number of cyclic shift pairs for the resource pool and, based on an indication by higher layers. $N_{type}^{PSFCH} = 1$ and the $M_{subch,slot}^{PSFCH}$ PRBs are associated with the starting sub-channel of the corresponding PSSCH. $N_{type}^{PSFCH} = N_{subch}^{PSSCH}$ and the $N_{subch}^{PSSCH} \cdot M_{subch,slot}^{PSFCH}$ slot PRBs are associated with one or more sub-channels from the $N_{subch}^{PSSCH}$ sub-channels of the corresponding PSSCH. The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.

In some embodiments, a PSFCH transmission resource in a time domain corresponding to a PSSCH can be determined by a pre-configured or configured timing gap between the PSSCH and a PSFCH.

In some embodiments, a timing gap between a slot used for a PSFCH and the last slot of a slot set that the slot corresponds to is determined by a minimal processing capability of the UE.

In some embodiments, the processor 11 or 21 is configured to perform a selection of a resource of at least one of a PSSCH or a PSFCH, and the selection of the resource of the at least one of the PSSCH or the PSFCH is associated with one or more receiver (RX) UEs; and the transceiver 13 or 23 is configured to perform a transmission of the resource of the at least one of the PSSCH or the PSFCH.

In some embodiments, the selection of the resource of the PSSCH is according to at least one of the followings: a number of the one or more RX UEs within a group that needs to transmit the resource of the PSSCH; a period of PSFCH resource; a sub-channel size, in unit of resource blocks (RBs); a number of RBs used by per PSFCH; or a number of PSFCH transmissions that can be code-division multiplexed (CDMed) within the same frequency resource.

In some embodiments, the resource of the PSSCH comprises a frequency size. In some embodiments, if a period of a PSFCH slot is N, the PSFCH slot corresponds to N slots of a PSSCH transmission.

Figure 6:
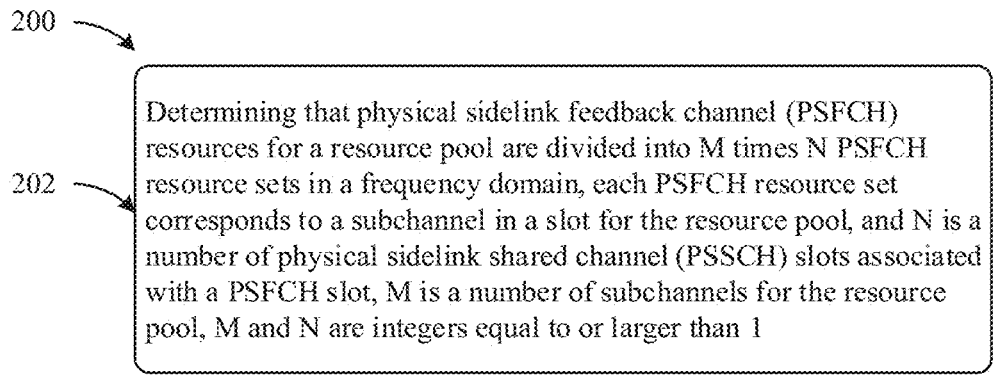
FIG. 6 is a flowchart illustrating a method of resource transmission of a user equipment according to an embodiment of the present disclosure.

FIG. 6 illustrates a method 200 of transmission resource selection of a UE according to an embodiment of the present disclosure.

In some embodiments, the method 200 includes: a block 202, determining that that physical sidelink feedback channel (PSFCH) resources for a resource pool are divided into M times N PSFCH resource sets in a frequency domain, each PSFCH resource set corresponds to a subchannel in a slot for the resource pool, and N is a number of physical sidelink shared channel (PSSCH) slots associated with a PSFCH slot, M is a number of subchannels for the resource pool, M and N are integers equal to or larger than 1. This can solve issues in the prior art, have enough resource for PSFCH transmission between multiple RX UEs, select resource of PSFCH per RX UE within an available transmission resource set, provide a good communication performance, and/or provide high reliability.

In details, the above technical solution can be adopted in 3GPP specification. The above technical solution can correspond to the following: A UE is provided by rbSetPSFCH a set of $M_{PRB,set}^{PSFCH}$ PRBs in a resource pool for PSFCH transmission in a PRB of the resource pool. For a number of $N_{subch}$ sub-channels for the resource pool, provided by numSubchannel, and a number of $N_{PSSCH}^{PSFCH}$ slots associated with a PSFCH slot, provided by periodPSFCHresource, the UE allocates the $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH} -1]$ PRBs from the $M_{PRB,set}^{PSFCH}$ PRBs to slot i and sub-channel j, where $M_{subch,slot}^{PSFCH} = M_{PRB,set}^{PSFCH} / (N_{subch} \cdot N_{PSSCH}^{PSFCH})$, $0 \leq i < N_{PSSCH}^{PSFCH}$, $0 \leq j < N_{subch}$, and the allocation starts in an ascending order of i and continues in an ascending order of j. The UE expects that $M_{PRB,set}^{PSFCH}$ is a multiple of $N_{subch} \cdot N_{PSSCH}^{PSFCH}$.

Figure 7:
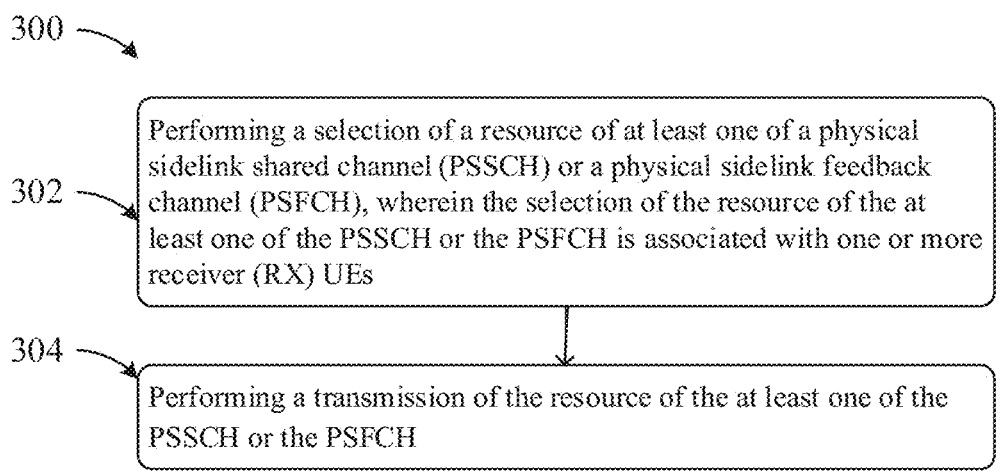
FIG. 7 is a flowchart illustrating a method of transmission resource selection of a user equipment according to an embodiment of the present disclosure.

FIG. 7 illustrates a method 300 of transmission resource selection of a UE according to an embodiment of the present disclosure.

In some embodiments, the method 300 includes: a block 302, performing a selection of a resource of at least one of a physical sidelink shared channel (PSSCH) or a physical sidelink feedback channel (PSFCH), wherein the selection of the resource of the at least one of the PSSCH or the PSFCH is associated with one or more receiver (RX) UEs, and a block 304, performing a transmission of the resource of the at least one of the PSSCH or the PSFCH. This can solve issues in the prior art, select a resource of at least one of PSSCH or PSFCH, have enough resource for PSFCH transmission between multiple RX UEs, and/or select resource of PSFCH per RX UE within an available transmission resource set.

In some embodiments, a period of PSFCH resources is N slots.

In some embodiments, a correspondence between the PSFCH resource sets and PSSCH transmission resources comprises that the PSFCH resource sets are allocated to the PSSCH transmission resources according to the PSSCH transmission resources first in a time domain and then in the frequency domain. In details, PSSCH transmission resources are resources that may be used for PSSCH transmission, and each subchannel in each slot may be used to transmit a PSSCH.

In some embodiments, the PSFCH resource sets are allocated to the PSSCH transmission resources comprises that: a PSFCH resource set is allocated to slot i and sub-channel j, in an ascending order of i and then in an ascending order of j; wherein i=1, 2, . . . N, j=1, 2, . . . M, and the PSFCH resource sets are allocated from lower frequency to higher frequency.

In some embodiments, the method further comprises determining a number of PSFCH resources available for multiplexing hybrid automatic repeat request-acknowledgement (HARQ-ACK) information in the PSFCH transmission. The above technical solution can be adopted in 3GPP specification. The above technical solution can correspond to the following: In determining PSFCH candidate resources for a PSFCH format from the starting sub-channel index and the slot index used for the corresponding PSSCH for actual transmission, within the set of PRBs (pre-) configured for the actual PSFCH resources, the first Z PRBs are associated with the first sub-channel in the first slot associated with the PSFCH slot, the second Z PRBs are associated with the first sub-channel in the second slot associated with the PSFCH slot, and so on. A UE is provided by rbSetPSFCH a set of $M_{PRB,set}^{PSFCH}$ PRBs in a resource pool for PSFCH transmission in a PRB of the resource pool. For a number of $N_{subch}$ sub-channels for the resource pool, provided by numSubchannel, and a number of $N_{PSSCH}^{PSFCH}$ slots associated with a PSFCH slot, provided by periodPSFCHresource, the UE allocates the $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH}-1]$ PRBs from the $M_{PRB,set}^{PSFCH}$ PRBs to slot i and sub-channel j, where $M_{subch,slot}^{PSFCH} = M_{PRB,set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB,set}^{PSFCH}$ is a multiple of $N_{subch} \cdot N_{PSSCH}^{PSFCH}$.

In some embodiments, PSFCH transmissions from one or more receiver (RX) UEs within the same group can be frequency division multiplexed (FDMed) or code-division multiplexed (CDMed). In details, the above technical solution, PSFCH transmissions from one or more receiver (RX) UEs within the same group can be frequency division multiplexed (FDMed) or code-division multiplexed (CDMed), can be adopted in 3GPP specification. The above technical solution can correspond to the following: A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSECH}$ where $N_{CS}^{PSFCH}$ is a number of cyclic shift pairs for the resource pool and, based on an indication by higher layers.

In some embodiments, each PSFCH resource set comprises X resources in the frequency domain, and Y resources in a code domain, X and Y are integers equal to or larger than 1.

In some embodiments, PSFCH transmission resources in a PSFCH resource set are indexed with numbers in an ascending order firstly in the frequency domain, and then in the code domain.

In some embodiments, the RX UEs select different resources firstly in the frequency domain for PSFCH transmission and then in a code domain.

In some embodiments, a PSFCH transmission resource is determined by a PSSCH transmission resource.

In details, X refers, corresponds, or is equivalent to $N_{subch}^{PSSCH} \cdot M_{subch,slot}^{PSFCH}$ PRBs. Y refers, corresponds, or is equivalent to $N_{CS}^{PSFCH}$. The above technical solution can be adopted in 3GPP specification. The above technical solution can correspond to the following: A UE determines a number of PSFCH resources available for multiplexing HARQ-ACK information in a PSFCH transmission as $R_{PRB,CS}^{PSFCH} = N_{type}^{PSECH} \cdot M_{subch,slot}^{PSFCH} \cdot N_{CS}^{PSFCH}$ where NPS CH is a number of cyclic shift pairs for the resource pool and, based on an indication by higher layers. $N_{type}^{PSFCH}=1$ and the $M_{subch,slot}^{PSFCH}$ PRBs are associated with the starting sub-channel of the corresponding PSSCH. $N_{type}^{PSFCH}=N_{subch}^{PSSCH}$ and the $N_{subch}^{PSSCH} \cdot M_{subch,slot}^{PSFCH}$ PRBs are associated with one or more sub-channels from the $N_{subch}^{PSSCH}$ sub-channels of the corresponding PSSCH. The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.

In some embodiments, a PSFCH transmission resource in a time domain corresponding to a PSSCH can be determined by a pre-configured or configured timing gap between the PSSCH and a PSFCH.

In some embodiments, a timing gap between a slot used for a PSFCH and the last slot of a slot set that the slot corresponds to is determined by a minimal processing capability of the UE.

In some embodiments, the method further comprises performing a selection of a resource of at least one of a PSSCH or a PSFCH, and the selection of the resource of the at least one of the PSSCH or the PSFCH is associated with one or more receiver (RX) UEs; and the method comprises performing a transmission of the resource of the at least one of the PSSCH or the PSFCH.

In some embodiments, the selection of the resource of the PSSCH is according to at least one of the followings: a number of the one or more RX UEs within a group that needs to transmit the resource of the PSSCH; a period of PSFCH resource; a sub-channel size, in unit of resource blocks (RBs); a number of RBs used by per PSFCH; or a number of PSFCH transmissions that can be code-division multiplexed (CDMed) within the same frequency resource.

In some embodiments, the resource of the PSSCH comprises a frequency size. In some embodiments, if a period of a PSFCH slot is N, the PSFCH slot corresponds to N slots of a PSSCH transmission.

In some embodiments, if frequency multiplexing of a PSFCH transmission corresponds to the PSSCH transmission in different slots within the same slot set, the frequency resource of PSFCH is divided into N parts, and each part of the PSFCH resource is used for the PSFCH transmission corresponding to the PSSCH transmission in one slot.

In some embodiments, the one subchannel of the PSSCH is minimal granularity of the resource of the PSSCH in a frequency domain.

In some embodiments, multiple PSFCH transmissions from the one or more RX UEs within the same group are frequency division multiplexing (FDM) or code-division multiplexing (CDM).

In some embodiments, the selection of the resource of the PSFCH of the one or more RX UEs in a frequency domain is prioritized over a code domain. The above technical solution can be adopted in 3GPP specification. The above technical solution can correspond to the following: In determining PSFCH candidate resources for a PSFCH format from the starting sub-channel index and the slot index used for the corresponding PSSCH for actual transmission, within the set of PRBs (pre-) configured for the actual PSFCH resources, the first Z PRBs are associated with the first sub-channel in the first slot associated with the PSFCH slot, the second Z PRBs are associated with the first sub-channel in the second slot associated with the PSFCH slot, and so on. A UE is provided by rbSetPSFCH a set of $M_{PRB,set}^{PSFCH}$ PRBs in a resource pool for PSFCH transmission in a PRB of the resource pool. For a number of $N_{subch}$ sub-channels for the resource pool, provided by numSubchannel, and a number of $N_{PSSCH}^{PSFCH}$ PSSCH slots associated with a PSFCH slot, provided by periodPSFCHresource, the UE allocates the $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH}-1]$ PRBs from the $M_{PRB,set}^{PSFCH}$ PRBs to slot i and sub-channel j, where $M_{subch,slot}^{PSFCH} = M_{PRB,set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB,set}^{PSFCH}$ is a multiple of $N_{subch} \cdot N_{PSSCH}^{PSFCH}$.

In some embodiments, if multiple PSFCH transmissions from the RX UEs within the same group are frequency division multiplexing (FDM) or code-division multiplexing (CDM), different frequency resources for the PSFCH transmissions are selected by the RX UEs.

In some embodiments, if there is no more frequency resource available, the resource in the code domain is selected by the remaining RX UEs. In details, the above technical solution can be adopted in 3GPP specification. The above technical solution can correspond to the following: A UE determines an index of a PSFCH resource for a PSFCH transmission in response to a PSSCH reception as $(P_{ID}+M_{ID}) \bmod R_{PRB,CS}^{PSFCH}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

Figure 8:
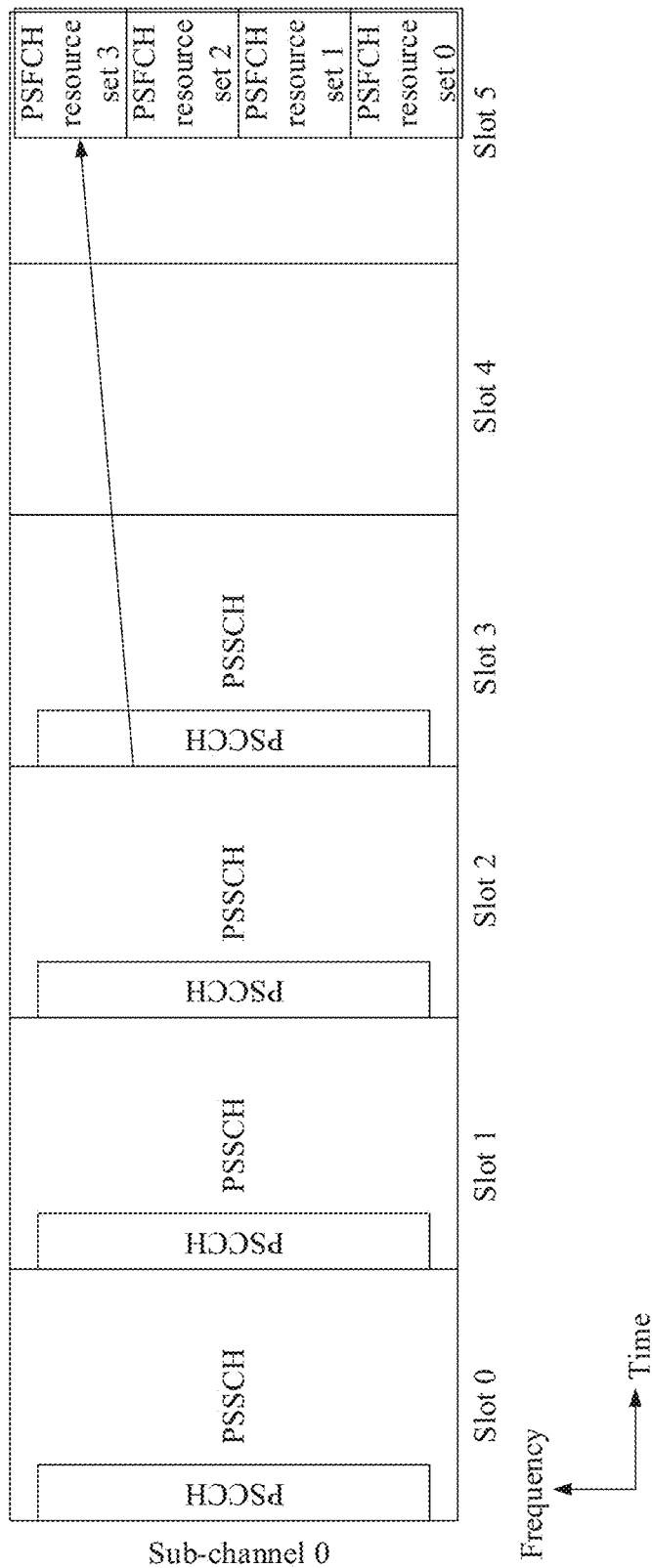
FIG. 8 is a schematic diagram of an exemplary illustration of multiple physical sidelink feedback channels (PSFCHs) according to an embodiment of the present disclosure.

FIG. 8 is an exemplary illustration of multiple physical sidelink feedback channels (PSFCHs) according to an embodiment of the present disclosure.

In some embodiments, a selection of frequency size of PSSCH is determined by a number of RX UE(s) within a group. If a period of PSFCH slot is N, that means a PSFCH slot corresponds to N slots of PSSCH transmission. If frequency multiplexing of PSFCH transmission corresponds to PSSCH transmission in different slots within the same slot set is preferred, then one subchannel of PSSCH, which is minimal granularity of PSSCH resource in frequency domain, will be divided into N parts, and each part is used for PSFCH transmission corresponds to PSSCH transmission in one slot.

For example, in FIG. 8, N=4. The feedback slot (slot 5) corresponds to PSSCH transmission in 4 slots, i.e., the slot set of {slot 0, slot 1, slot 2, slot 3}. If a sub-channel size of PSSCH is 8 RBs, then the sub-channel will be divided into 4 equal parts and each part consists of 2 continuous RBs. Each part is a PSFCH resource set which can be used for PSFCH transmission.

If PSFCH can only use 1 RB, then there can be 2 PSFCH transmissions using different frequency resources within each PSFCH resource set. FIG. 8 illustrated that, is some embodiments, PSFCH resource set 0 is used for PSFCH transmission which corresponds to PSSCH transmission in slot 0, and PSFCH resource set 1 is used for PSFCH transmission which corresponds to PSSCH transmission in slot 1, and so on.

Multiple PSFCH transmissions from RX UEs within the same group can be FDM or CDM. The selection of PSSCH frequency resource is determined by the number of RX UEs. One illustration of how to select the frequency resource of PSSCH is as follows. For convenience, some embodiments assume the following variables.

K: Number of RX UEs within a group that needs to transmit PSFCH to TX UE.
N: Period of PSFCH slot.
A: Sub-channel size, in unit of RBs.
B: Number of RBs used by per PSFCH channel.
C: Number of PSFCH transmission that can be CDMed within the same frequency resource.
P=[A/N]: Number of RBs per PSFCH resource set.
Q=[P/B]: Number of PSFCH that can be FDMed within a PSFCH resource set.
R=Q*C: Number of PSFCH that can be transmitted within a PSFCH resource set, including CDM and FDM.
S=[K/R]: Number of sub-channels that is needed for PSSCH transmission in case of groupcast communication.

FIG. 8 illustrated that, is some embodiments, for example, if the number of UEs within a group is 20, then 1 UE is TX UE, the other 19 UEs are RX UE, i.e., K=19. If a sub-channel size of PSSCH is 8 RBs (A=8), and the period of PSFCH is 4 (N=4). PSFCH uses only 1 RB (B=1), and up to 4 PSFCH can be CDMed within an RB (C=4). The selection of frequency resource size of PSSCH should promise there is enough transmission resource for PSFCH transmission of RX UEs. In the above example, the number of sub-channels of PSSCH should be at least 3.

From the above example, it illustrates that the selection of frequency resource of PSSCH in groupcast communication is determined by the following factors:

K: Number of RX UEs within a group that needs to transmit PSFCH to TX UE.
N: Period of PSFCH slot.
A: Sub-channel size, in unit of RBs.
B: Number of RBs used by per PSFCH channel.
C: Number of PSFCH transmission that can be CDMed within the same frequency resource.

In some embodiments, for the selection of transmission resource of PSFCH between RX UEs, resource in frequency domain is prioritized over resource in code domain.

In some embodiments, if PSFCH transmission between multiple RX UEs can be either FDM or CDM within the resource set for PSFCH transmission, the RX UEs should select different frequency resources for PSFCH transmission firstly. If there is no more frequency resource available, the remaining RX UEs can select resource in the code domain.

The benefit to select different frequency resources firstly is to alleviate near-far effect. It is possible that different RX UEs have different distances to the TX UE, that will cause near-far effect. If multiple RX UEs select the same frequency resource, but different code resources, the PSFCH transmission from RX UE1 which is close to TX UE may overwhelm the PSFCH transmission from RX UE2 which is far to TX UE, so that the TX UE cannot detect the PSFCH transmission from RX UE2.

Figure 9:
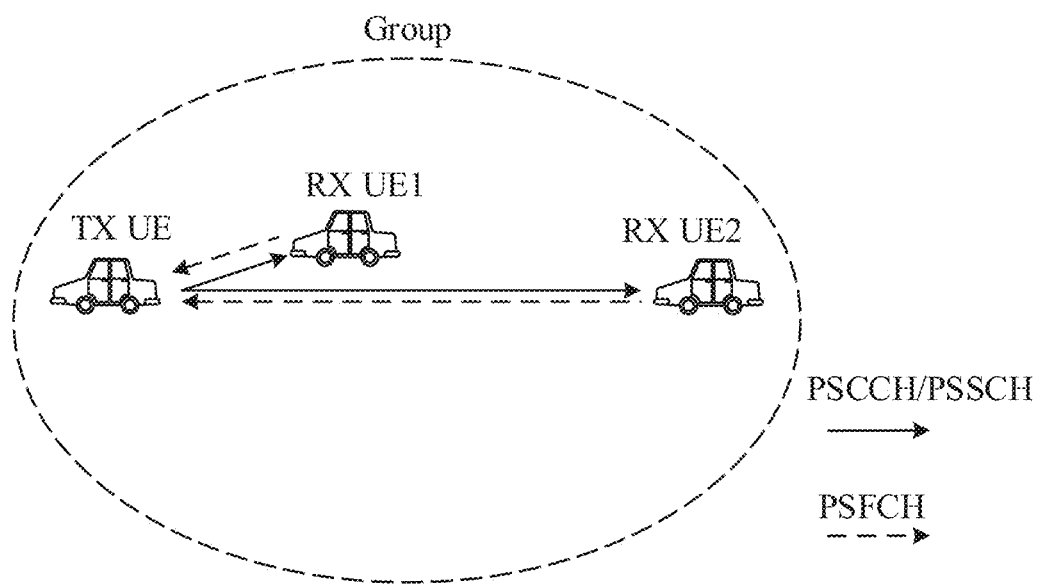
FIG. 9 is a schematic diagram of an exemplary illustration that TX UE, RX UE1, and RX UE2 forms a communication group according to an embodiment of the present disclosure.

FIG. 9 is an exemplary illustration that TX UE, RX UE1, and RX UE2 forms a communication group according to an embodiment of the present disclosure. FIG. 9 illustrated that, in some embodiments, TX UE, RX UE1, and RX UE2 forms a communication group. TX UE transmits PSCCH and PSSCH to the other two UEs (that is RX UE1, and RX UE2). RX UE1 and RX UE2 need to transmit PSFCH to TX UE. RX UE1 is close to TX UE, such as 50 m, and RX UE2 is far to TX UE, such as 300 m. if RX UE1 and RX UE2 select the same frequency resource, but different code resources for PSFCH transmission, the PSFCH transmission from RX UE2 may be overwhelmed by the PSFCH transmission from RX UE1, since the received power of PSFCH from RX UE1 is higher than RX UE2. That will cause TX UE detecting PSFCH from RX UE2 failed.

Figure 10:
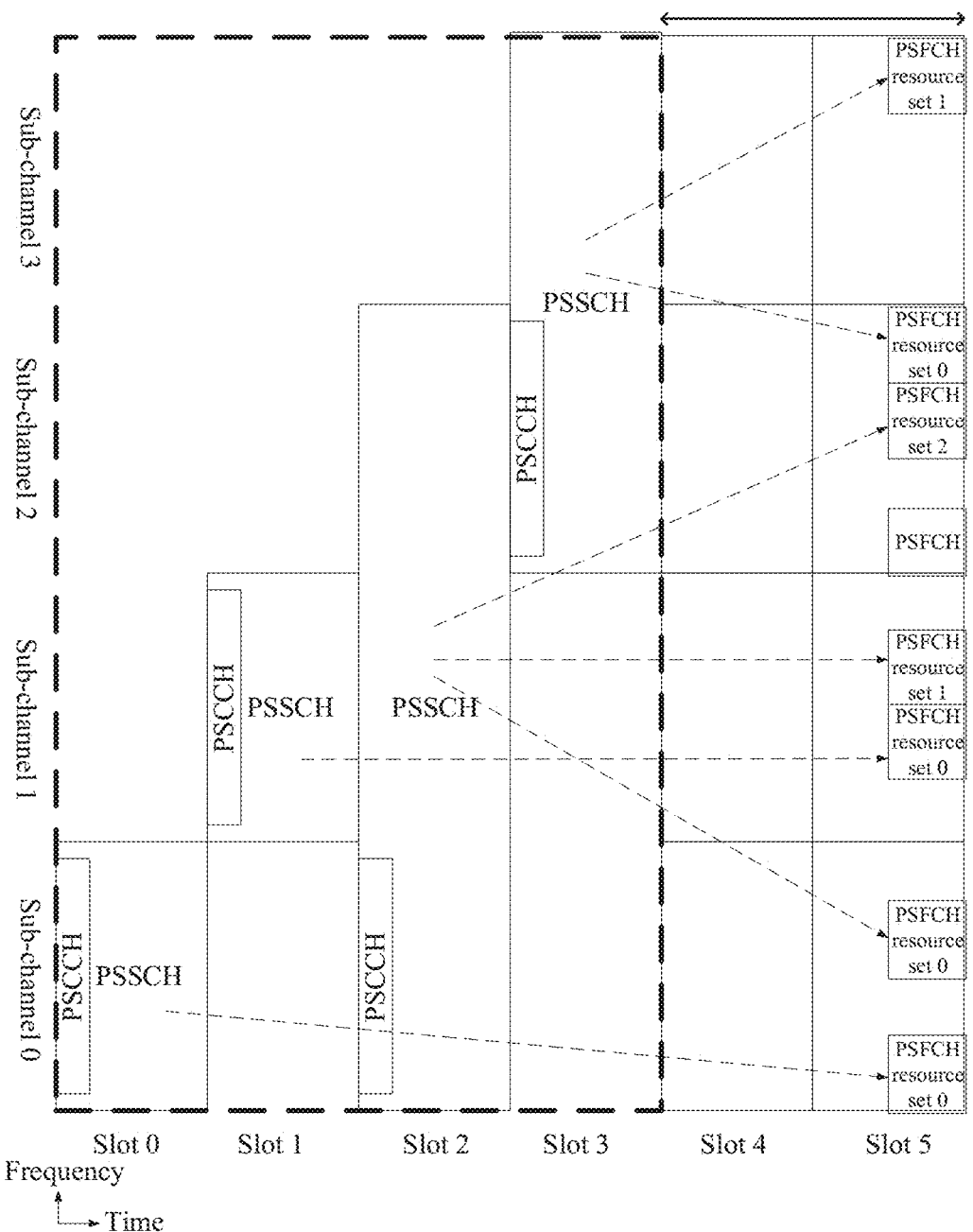
FIG. 10 is a schematic diagram of an exemplary illustration for RX UEs to select transmission resource in a frequency domain according to an embodiment of the present disclosure.

In this case, it is preferring to select different transmission resources for PSFCH transmission for RX UE1 and RX UE2. FIG. 10 is an exemplary illustration for RX UEs to select transmission resource in a frequency domain according to an embodiment of the present disclosure. FIG. 10 illustrates that, in some embodiments, if TX UE transmits PSSCH in slot 2 using 3 sub-channels. That corresponds to 3 different PSFCH resource sets in the PSFCH slot.

It is preferred that RX UE1 and RX UE2 select different PSFCH resource sets, instead of different code resources within the same resource set. For example, RX UE1 selects PSFCH resource set 0, and RX UE2 selects PSFCH resource set 1, then the interference between RX UE1 and RX UE2 can be alleviated because of different frequency domain.

Figure 11:
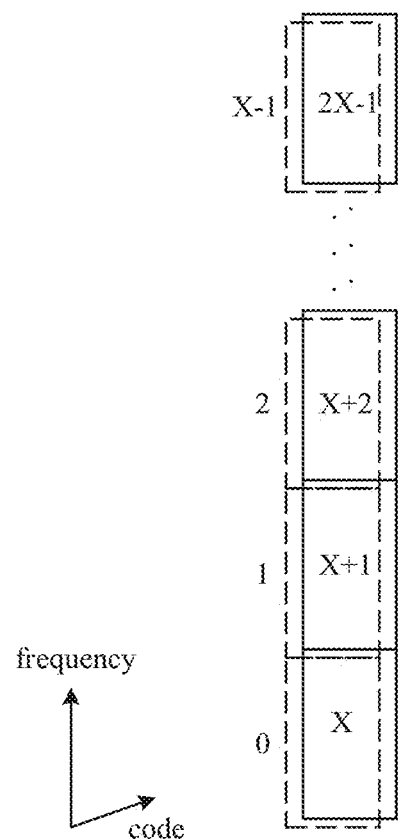
FIG. 11 is a schematic diagram of an exemplary illustration of multiple physical sidelink feedback channels (PSFCHs) according to an embodiment of the present disclosure.

FIG. 11 is an exemplary illustration of multiple physical sidelink feedback channels (PSFCHs) according to an embodiment of the present disclosure. FIG. 11 illustrates that, in some embodiments, one illustration for RX UEs to select transmission resource in frequency domain firstly is as follows. Set M as the total number of resources that can be used for PSFCH transmission, corresponds to the PSSCH transmission. PSFCH transmission can be either FDM or CDM within the transmission resources.

There are X different resources in frequency domain, and Y different resources in code domain, then W=X*Y. The transmission resources of PSFCH are numbered from 0 to X−1 in frequency domain firstly, and then in code domain, which is illustrated in FIG. 11.

Commercial interests for some embodiments are as follows. 1. Solving issues in the prior art. 2. Selecting a resource of at least one of PSSCH or PSFCH. 3. Having enough resource for PSFCH transmission between multiple RX UEs. 4. Selecting resource of PSFCH per RX UE within an available transmission resource set. 5. Providing good communication performance. 6. Providing high reliability. 7.

Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 12:
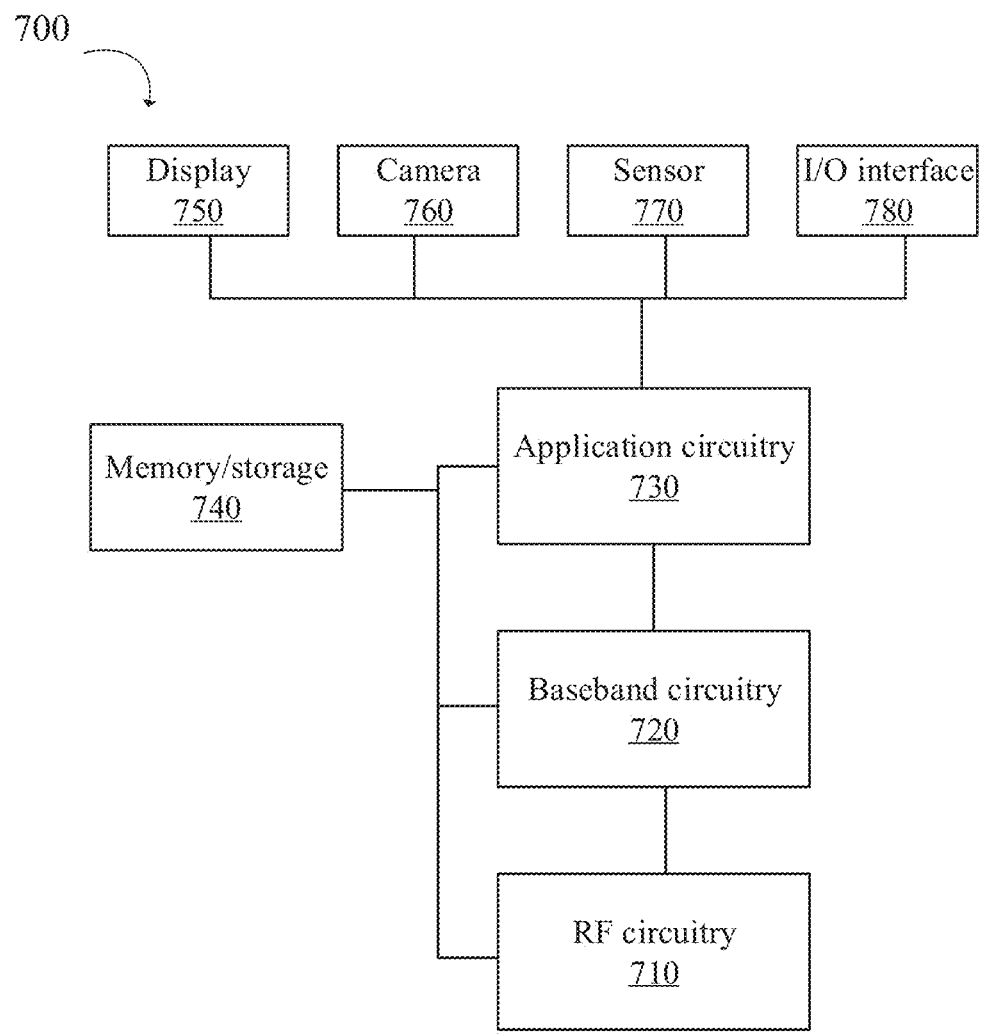
FIG. 12 is a block diagram of a system for wireless communication according to an embodiment of the present disclosure.

FIG. 12 is a block diagram of an example system 700 for wireless communication according to an embodiment of the present disclosure.

Embodiments described herein may be implemented into the system using any suitably configured hardware and/or software. FIG. 12 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc.

In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry.

As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system.

In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc.

In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product.

The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE), comprising:
a memory;
a transceiver; and
a processor coupled to the memory and the transceiver;
wherein the processor is configured to determine that physical sidelink feedback channel (PSFCH) resources for a resource pool are divided into M times N PSFCH resource sets in a frequency domain, each PSFCH resource set corresponds to a subchannel in a slot for the resource pool, and N is a number of physical sidelink shared channel (PSSCH) slots associated with a PSFCH slot, M is a number of subchannels for the resource pool, M and N are integers equal to or larger than 1,
wherein each PSFCH resource set comprises X resources in the frequency domain, and Y resources in a code domain, X and Y are integers equal to or larger than 1, and
wherein PSFCH transmission resources in a PSFCH resource set are indexed with numbers in an ascending order firstly in the frequency domain, and then in the code domain.

2. The UE of claim 1, wherein a period of PSFCH resources is N slots.

3. The UE of claim 1, wherein a correspondence between the PSFCH resource sets and PSSCH transmission resources comprises that the PSFCH resource sets are allocated to the PSSCH transmission resources according to the PSSCH transmission resources first in a time domain and then in the frequency domain.

4. The UE of claim 3, wherein the PSFCH resource sets are allocated to the PSSCH transmission resources comprises that:
a PSFCH resource set is allocated to slot i and subchannel j, in an ascending order of i and then in an ascending order of j; wherein i=1, 2, . . . N, j=1, 2, . . . M, and the PSFCH resource sets are allocated from lower frequency to higher frequency.

5. The UE of claim 1, wherein the processor is configured to determine a number of PSFCH resources available for multiplexing hybrid automatic repeat request-acknowledgement (HARQ-ACK) information in the PSFCH transmission.

6. The UE of claim 1, wherein PSFCH transmissions from one or more receiver (RX) UEs within the same group can be frequency division multiplexed (FDMed) or code-division multiplexed (CDMed).

7. The UE of claim 6, wherein the RX UEs select different resources firstly in the frequency domain for PSFCH transmission and then in a code domain.

8. A method of resource transmission of a user equipment, comprising:
determining that physical sidelink feedback channel (PSFCH) resources for a resource pool are divided into M times N PSFCH resource sets in a frequency domain, each PSFCH resource set corresponds to a subchannel in a slot for the resource pool, and N is a number of physical sidelink shared channel (PSSCH) slots associated with a PSFCH slot, M is a number of subchannels for the resource pool, M and N are integers equal to or larger than 1, wherein each PSFCH resource set comprises X resources in the frequency domain, and Y resources in a code domain, X and Y are integers equal to or larger than 1, and wherein PSFCH transmission resources in a PSFCH resource set are indexed with numbers in an ascending order firstly in the frequency domain, and then in the code domain.

9. The method of claim 8, wherein a period of PSFCH resources is N slots.

10. The method of claim 8, further comprising determining a number of PSFCH resources available for multiplexing hybrid automatic repeat request-acknowledgement (HARQ-ACK) information in the PSFCH transmission corresponding to a PSSCH transmission.

11. The method of claim 8, wherein PSFCH transmissions from one or more receiver (RX) UEs within the same group can be frequency division multiplexed (FDMed) or code-division multiplexed (CDMed).

12. The method of claim 11, wherein the RX UEs select different resources firstly in the frequency domain for PSFCH transmission and then in a code domain.

13. The method of claim 8, wherein a PSFCH transmission resource is determined by a PSSCH transmission resource.

14. The method of claim 13, wherein a PSFCH transmission resource in a time domain corresponding to a PSSCH can be determined by a pre-configured or configured timing gap between the PSSCH and a PSFCH.

15. The method of claim 8, wherein if a period of a PSFCH slot is N, the PSFCH slot corresponds to N slots of a PSSCH transmission.

16. A non-transitory machine-readable storage medium having stored thereon instructions that, when executed by a computer, cause the computer to perform steps of:

determining that physical sidelink feedback channel (PSFCH) resources for a resource pool are divided into M times N PSFCH resource sets in a frequency domain, each PSFCH resource set corresponds to a subchannel in a slot for the resource pool, and N is a number of physical sidelink shared channel (PSSCH) slots associated with a PSFCH slot, M is a number of subchannels for the resource pool, M and N are integers equal to or larger than 1, wherein each PSFCH resource set comprises X resources in the frequency domain, and Y resources in a code domain, X and Y are integers equal to or larger than 1, and wherein PSFCH transmission resources in a PSFCH resource set are indexed with numbers in an ascending order firstly in the frequency domain, and then in the code domain.

* * * * *